United States Patent
Shikimachi et al.

(10) Patent No.: US 8,315,798 B2
(45) Date of Patent: Nov. 20, 2012

(54) NAVIGATION DEVICE, AND METHOD FOR UPDATING MAP DATA AND NAVIGATION

(75) Inventors: Takeshi Shikimachi, Kariya (JP); Osamu Kanematsu, Nagoya (JP)

(73) Assignee: DENSO CORPORATION, Kariya (JP)

( * ) Notice: Subject to any disclaimer, the term of this patent is extended or adjusted under 35 U.S.C. 154(b) by 594 days.

(21) Appl. No.: 12/585,526

(22) Filed: Sep. 17, 2009

(65) Prior Publication Data

US 2010/0125408 A1    May 20, 2010

(30) Foreign Application Priority Data

Nov. 19, 2008    (JP) .................... 2008-295812

(51) Int. Cl.
- G01C 21/34    (2006.01)
- G01C 21/26    (2006.01)
- G01C 21/00    (2006.01)

(52) U.S. Cl. ........................ 701/450; 701/417
(58) Field of Classification Search .............. 701/450
See application file for complete search history.

(56) References Cited

U.S. PATENT DOCUMENTS

| | | | |
|---|---|---|---|
| 6,125,323 | A | 9/2000 | Nimura et al. |
| 2005/0102098 | A1* | 5/2005 | Montealegre et al. ......... 701/209 |
| 2007/0038365 | A1* | 2/2007 | An et al. ....................... 701/200 |
| 2008/0065327 | A1 | 3/2008 | Sobue |
| 2008/0103692 | A1* | 5/2008 | Nomura ......................... 701/208 |
| 2008/0120171 | A1* | 5/2008 | Ikeuchi et al. ................. 705/13 |
| 2008/0154497 | A1 | 6/2008 | Terao |

FOREIGN PATENT DOCUMENTS

| | | |
|---|---|---|
| JP | A-09-53950 | 2/1997 |
| JP | A-2005-172578 | 6/2005 |

OTHER PUBLICATIONS

Notice of Rejection mailed on Nov. 9, 2010 from the Japan Patent Office in corresponding Japanese Application No. 2008-295812 (English translation enclosed).

Office Action dated Apr. 24, 2012 in corresponding CN Application No. 200910222842.0 (and English translation).

* cited by examiner

*Primary Examiner* — Michael J. Zanelli
(74) *Attorney, Agent, or Firm* — Posz Law Group, PLC (57) ABSTRACT

A setting section sets a determination region, which is a certain geography range around a destination in a map specified by map data. A generating section generates a new road, which is not registered in the map data, based on a moving track of a navigation device when a current position of the navigation device deviates from an existing road registered in the map data. A new road registering section registers the generated new road in a storing section when a determination section determines that the set determination region includes at least a part of the generated new road. The navigation device performs the routing assistance to the destination using both the existing road registered in the map data and the registered new road.

16 Claims, 4 Drawing Sheets

NAVIGATION DEVICE, AND METHOD FOR UPDATING MAP DATA AND NAVIGATION

CROSS REFERENCE TO RELATED APPLICATIONS

This application is based on and incorporates herein by reference Japanese Patent Application No. 2008-295812 filed on Nov. 19, 2008.

FIELD OF THE INVENTION

The present invention relates to a navigation device for performing a routing assistance to a destination based on map data. The present invention further relates to a method for updating map data for the navigation device. The present invention further relates to a method for navigation using the updated map data.

BACKGROUND OF THE INVENTION

Conventionally, a known navigation device learns a new road, which is not registered in map data, based on a moving track of a movable body such as a vehicle. For example, as disclosed in JP-A-2005-172578, a road learning function enables to generate and store a new road data, which does not exist in map data. The road learning function enables to generate the new road data based on a running track from a point, at which the present position deviates from an existing road in the map data, to a point, at which the vehicle returns to an existing road in the map data. Whereby, the road learning function enables to learn the new road, which was not registered in the map data. Such a road learning function enables to perform a routing assistance using the new road without obtaining additional update information from an outside to update map data.

However, such a road learning function may learn various new roads, regardless of contribution to the routing assistance of the navigation device. For example, when an access road extends from an existing road around the destination of a routing assistance to the destination, and when the access road is learned as a new road, the leaned new road enables the vehicle to accurately arrive at the destination. In this case, the leaned new road is high in utility value. Thus, such a new road is conceived to contribute greatly to enhance accuracy of the routing assistance.

On the other hand, when the vehicle takes a side trip on the way to the destination, for example, a moving track of the vehicle in a parking lot may be learned as a new road. Such a new road is low in utility value when used for routing assistance to a destination. Thus, such a new road is conceived not to contribute to enhance accuracy of the routing assistance. Therefore, when such a new road, which is low in utility value, is learned as a learning object, effect of the road learning function may be impaired.

SUMMARY OF THE INVENTION

In view of the foregoing and other subjects, it is an object of the present invention to produce a navigation device capable of selectively learning a road, which is high in utility value in a routing assistance.

According to one aspect of the present invention, a navigation device comprises a setting section configured to set a determination region, which is a certain geography range around a destination in a map specified by map data, the destination being specified as an object of a routing assistance in the map data. The navigation device further comprises a generating section configured to generate a new road, which is not registered in the map data, based on a moving track of the navigation device when a current position of the navigation device deviates from a region of an existing road registered in the map data. The navigation device further comprises a determination section configured to determine whether the set determination region includes at least a part of the generated new road. The navigation device further comprises a storing section capable of storing the generated new road. The navigation device further comprises a new road registering section configured to register the generated new road in the storing section when the determination section determines that the set determination region includes at least a part of the generated new road. The navigation device is configured to perform the routing assistance to the destination using both the existing road registered in the map data and the registered new road.

According to another aspect of the present invention, a method for updating map data for a navigation device, the method comprises setting a determination region, which is a certain geography range around a destination in a map specified by map data. The method further comprises generating a new road, which is not registered in the map data, based on a moving track of a navigation device when a current position of the navigation device deviates from a region of an existing road registered in the map data. The method further comprises determining whether the set determination region includes at least a part of the generated new road. The method further comprises registering the generated new road in a storing unit in response to determination that the set determination region includes at least a part of the generated new road.

A method for navigation, the method comprising the setting, the generating, the determining, the registering, and performing a routing assistance to the destination using both the existing road registered in the map data and the registered new road.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (Description of Navigation Device)

Figure 1:
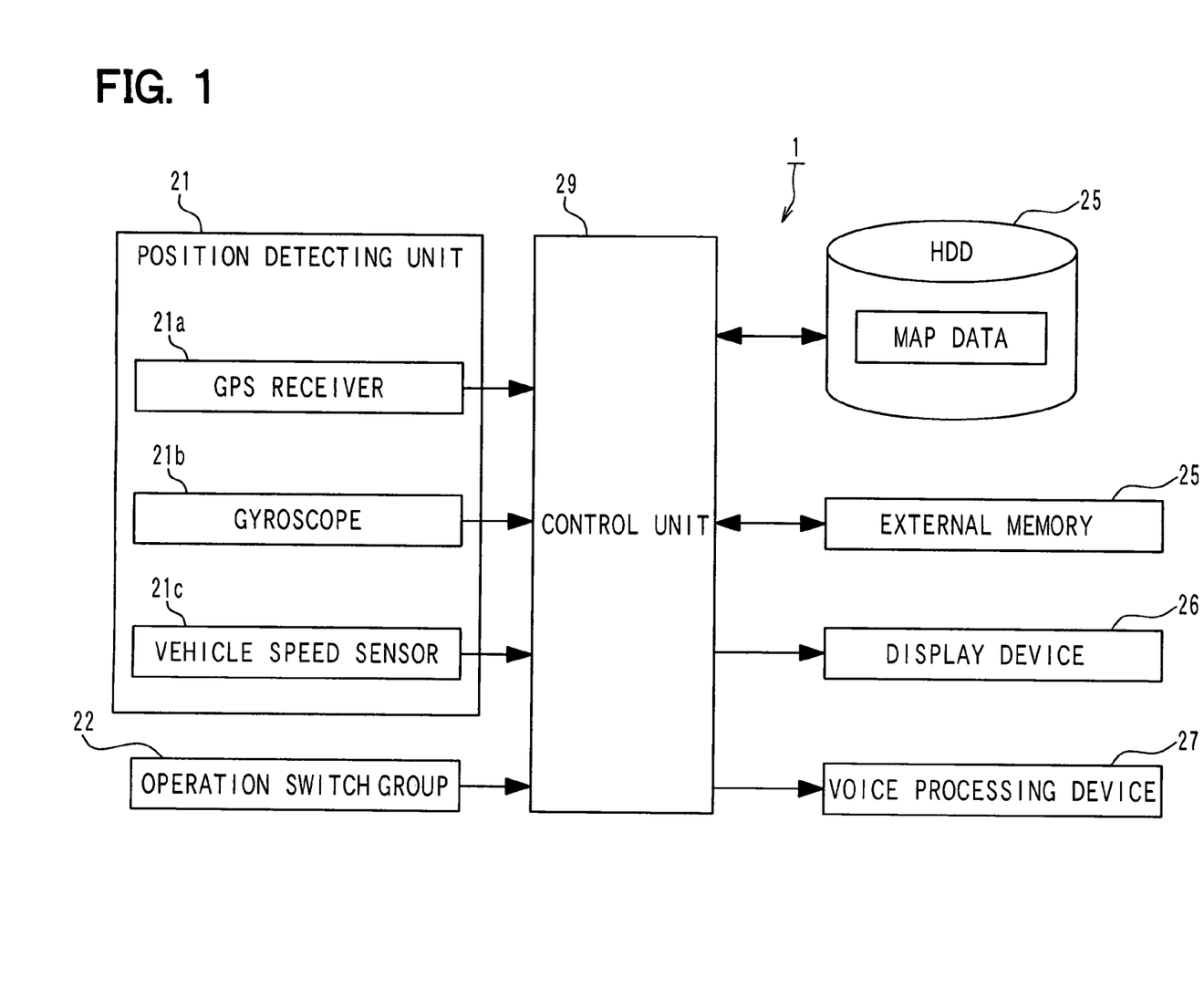
FIG. 1 is a block diagram showing a structure of the navigation device.

FIG. 1 is a block diagram showing a structure of a navigation device 1.

The navigation device 1 of the present embodiment is a navigation system mounted in a vehicle. As shown in FIG. 1, the navigation device 1 includes a position detecting unit 21, an operation switch group 22, a hard disk drive (HDD) 24, an external memory 25, a display device 26, a voice processing device 27, and a control unit 29. The position detecting unit 21 detects the present position of a vehicle. The operation switch group 22 is used for inputting various instructions from a user (occupant). The hard disk drive (HDD) 24 is a mass storage device for storing map data, a program, and the like. The external memory 25 stores a variety of information. The display device 26 indicates various kinds of information such as a map display screen. The voice processing device 27 outputs various kinds of guide voice.

The position detecting unit 21 includes a GPS receiver 21a, a gyroscope 21b, and a vehicle speed sensor 21c. The GPS receiver 21a receives a signal transmitted from a space satellite for a global positioning system (GPS) and detects the coordinate the altitude of the vehicle. The gyroscope 21b detects an angular velocity caused by a rotary motion of the vehicle and outputs a detection signal. The vehicle speed sensor 21c detects a speed of the vehicle and outputs a detection signal. Each of the sensors 21a to 21c has an error due to a difference of characters. Therefore, the present position of the vehicle is detected by complementing the errors of the sensors 21a to 21c.

The operation switch group 22 is constructed of a touch panel, which is, for example, integrally provided on a display surface of the display device 26, a mechanical key, which is, for example, provided around the display device 26, and/or the like. A HDD 23 is an external storage device for reading data from a hard disk and writing data to the hard disk according to a control of the control unit 29. The HDD 23 stores road data, map data, data for an operation of map matching, data for routing assistance, a program for an operation of the navigation device 1, various data including a design image, data and the like. The road data includes information of a connection of roads defined by nodes and links. Each of the nodes corresponds to a specific point such as an intersection. Each of the links connects two of the nodes. The map data includes drawing data for indication of a map image and the like.

The external memory 25 stores various data. The external memory 25 is a storage device such as a nonvolatile semiconductor memory configured to electronically, magnetically, or optically rewrite a content and maintain the stored content when de-energized. The display device 26 is, for example, a color display device such as a liquid crystal display. The display device 26 is configured to display various pictures according to a picture signal inputted from the control unit 29. The display device 26 is used for indication of a map image, a guidance path from a start point to a destination, a mark, which shows a present position of the vehicle, other guidance information, and the like. The voice processing device 27 is configured to cause a voice to notify a variety of information to a user. According to the present structure, a user can receive various routing assistances such as a direction guidance by both the indication of the display device 26 and the voice of the voice processing device 27.

The control unit 29 is, for example, a generally-known microcomputer, which includes a CPU, a ROM, a RAM, an I/O device, and a bus line, which connects thereamong. The control unit 29 performs various operations based on the program and data, which are read from the ROM, the HDD 24, the external memory 25, and the like.

In the navigation device 1, the HDD 24 and/or the external memory 25 is equivalent to a storing means, and the control unit 29 is equivalent to a setting means, a generating means, a determination means, and a new road recording device.

(Description of Processing)

As follows, an operation of the control unit 29 will be described.

A navigation-related operation may include a map indication operation, a routing assistance operation, and the like. In the map indication operation, the present position of the vehicle is first calculated based on the detection signal of the position detecting unit 21. A map image is generated based on the map data around the present position read from the HDD 24. The map image around the present position is displayed on the display device 26. The control unit 29 superimposes a mark, which shows the present position of the vehicle detected based on the detection signal of the position detecting unit 21, on the map image and causes the display device 26 to display the mark and the map image. The control unit 29 is further configured to move the mark of the present position correspondingly to movement of the vehicle. The control unit 29 may be further configured to scroll the map image correspondingly to movement of the vehicle.

In the routing assistance operation, a user manipulates the operation switch group 22 and sets a destination. Thereafter, the control unit 29 sets the present position of the vehicle as a start point and searches for an optimal path from the start point to the destination based on the road data read from the HDD 24. Thus, the control unit 29 superimposes the optimal path, which is obtained as a guidance path by the searching (path search), on the map image and causes the display device 26 to display the guidance path and the map image. Correspondingly to movement of the vehicle, the control unit 29 causes an output of guidance information by an image or a voice at a predetermined time point thereby to guide the vehicle along the guidance path to the destination.

Further, the navigation device 1 of the present embodiment has a learning function. Specifically, when the vehicle runs on a new road, which is not registered in the map data stored in the HDD 24, the navigation device 1 registers the new road as a learned road in the HDD 24 and/or the external memory 25. Further, the navigation device 1 uses the registered learned road similarly to existing road data in the routing assistance.

Specifically, the control unit 29, while the vehicle runs, periodically identifies the present position based on the signal of the position detecting unit 21. Thereby, the control unit 29 obtains a moving track of the coordinates of the vehicle from a point where the vehicle leaves the existing road registered in the map data to a point where the vehicle returns to the existing road in the map data. Thus, the control unit 29 generates data of a new road based on the detected moving track. The data of the new road is an aggregation of a link ID of the existing road, from which the vehicle left, and coordinates of a leaving point, at which the vehicle left the existing road, and a link ID of the existing road, to which the vehicle returned, and coordinates of a, return point, at which the vehicle returned to the existing road, and a coordinate points (configuration points), which shows a road geometry between the leaving point and the return point.

Further, the control unit 29 performs a learned road identifying operation as one processing of the learning function. Specifically, the control unit 29 identifies an access road, which is connected to the destination of the routing assistance, in the new road, and registers only the identified access road as a learning target in the map data. The operation will be described later in detail.

(Description of Learning Target Determination Region)

In the learned road identifying operation, the control unit 29 sets the learning target determination region (determination region) for determining whether the detected new road is an access road to the destination. First, the learning target determination region will be described in detail.

A user manipulates the operation switch group 22 to set the destination, and thereby the control unit 29 sets a predetermined range as the learning target determination region based on the set destination and stores the set learning target determination region in a RAM of the control unit 29 or the like.

The control unit 29 applies the stored learning target determination region to the learned road identifying operation.

As one example of a method for setting the learning target determination region, it is conceived to set a predetermined range around the destination as the learning target determination region. The predetermined range is, for example, tens of meters around the destination. The learning target determination region may be a fixed value. Alternatively, the learning target determination region may be changed according to the distance between the destination and an existing road, which is closest to the destination in the map data. For example, the map data may not include an access road from an existing road, which is closest to the destination, to the destination. In this case, it is conceived to enlarge the learning target determination region, as the distance between the destination and the existing road, which is closest to the destination, becomes large. Alternatively, the destination may exist in a region surrounded by existing roads. In this case, it is conceived to set the region surrounded by the existing roads as the learning target determination region.

The set learning target determination region may be maintained based on the following conditions and thereafter may be canceled when determined to be unnecessary.

(1) An arrival determination is made and outputted at a time point where the vehicle reaches a predetermined arrival determination region and is determined to be close to the destination while running on an existing road of the map data. The learning target determination region, which corresponds to the destination, is maintained after the arrival decision is made and outputted.

(2) The learning target determination region, which is set for the previous destination, is maintained until a user operates the operation switch group 22 to specify a destination of a new routing assistance. Thereafter, the learning target determination region is canceled. Subsequently, new information of the learning target determination region, which corresponds to the newly specified destination, is set and maintained.

(3) When the navigation device 1 is de-energized in response to, for example, deactivation of an accessory switch of the vehicle, the learning target determination region, which is currently maintained, is canceled.

(4) When the destination is canceled by a user's instruction in the course of routing assistance, the learning target determination region, which corresponds to the destination, is canceled.

Two or more of the conditions (1) to (4) may be combined and employed. Alternatively, one of the conditions (1) to (4) may be employed.

[Description of Learned Road Identifying Operation]

As follows, the learned road identifying operation, which the control unit 29 performs, will be described further in detail with reference to the flow chart of FIG. 2 and drawings of FIGS. 3, 4.

Figure 2:
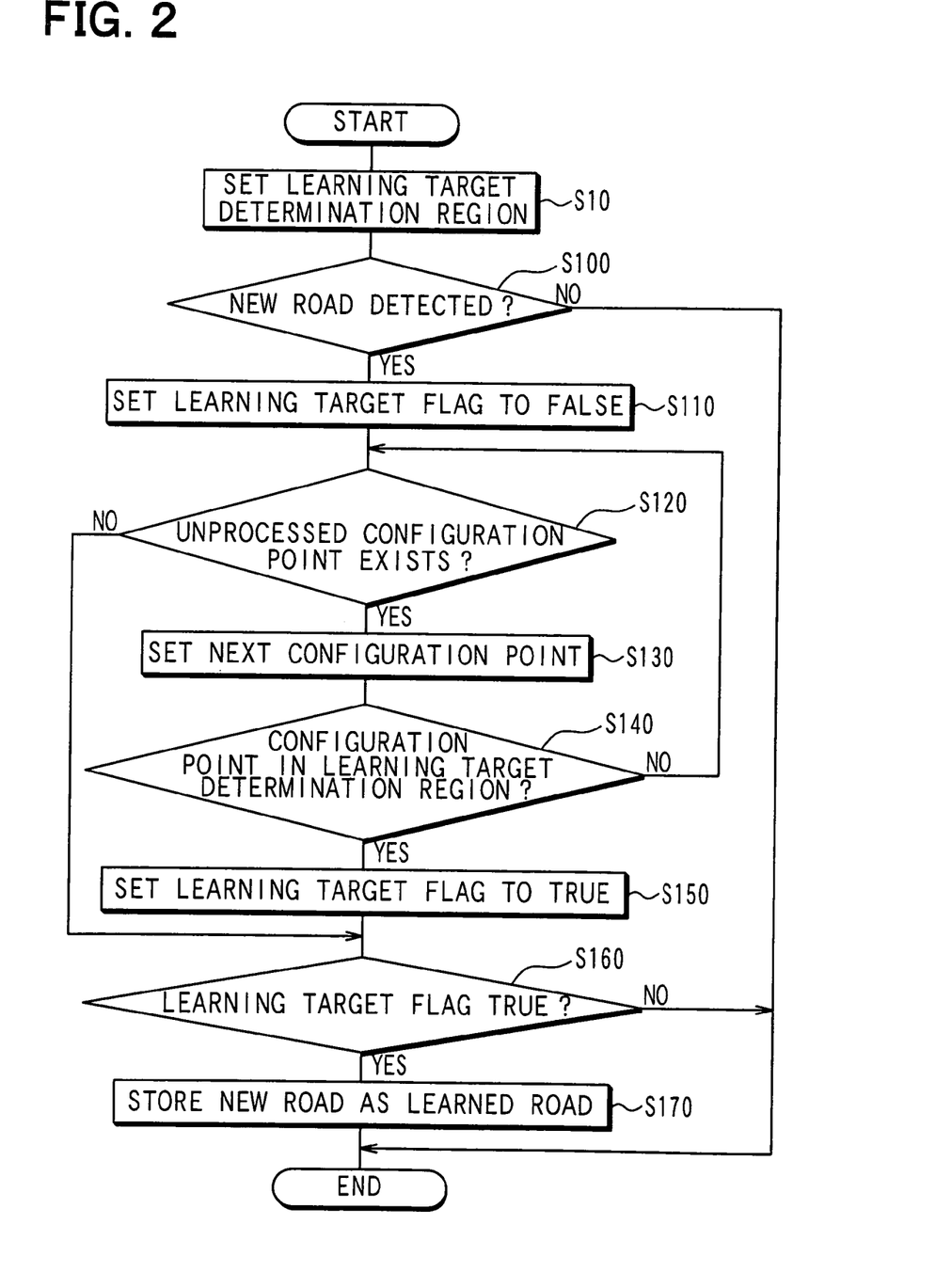
FIG. 2 is a flow chart showing a learned road identifying operation.

FIG. 2 is a flow chart showing a procedure of the learned road identifying operation of the control unit 29. The present processing is repeatedly performed during a period in which the learning target determination region, which is determined with respect to the destination in the routing assistance, is maintained.

At S10, a predetermined geography range is set as a learning, target determination region around the destination, which is an object of the routing assistance, in a map shown by the map data.

At S100, the control unit 29 first determines whether a new road, which is not registered in the map data, is detected based on the moving track of the vehicle. When it is determined that a new road is not detected, S100 makes a negative determination, and the learned road identifying operation is terminated. Alternatively, when it is determined that a new road is detected, S100 makes a positive determination. In this case, at S110, a learning target flag is first sets to false. The learning target flag indicates whether the new road is a learning target. That is, the learning target flag indicates whether the new road is an object to be stored as the learned road.

Subsequently, at S120, it is determined whether unprocessed configuration points exist among configuration points, which constitute the new road as a processing object. When it is determined that unprocessed configuration points exist, S120 makes a positive determination. In this case, at S130, coordinates of one of the unprocessed configuration points, which is a next processing object among the unprocessed configuration points, are set. Subsequently, at S140, it is determined whether the coordinates of the one configuration point, which is the processing object, are included in the learning target determination region, which is currently maintained. When the coordinates of the one configuration point, which is the processing object, are determined to be not included in the learning target determination region, S140 makes a negative determination, and the processing returns to S120. Henceforth, the processings of S120 to S140 are successively repeated, and comparison of the configuration points of the new road with the learning target determination region is successively repeated.

In the repletion of processings, when the coordinates of the configuration point, which is the processing object, is determined to be included in the learning target determination region at S140, S140 makes a positive determination. In this case, at S150, the learning target flag is set to true, and the processing proceeds to S160. Alternatively, when a configuration point, which is included in the learning target determination region, is not found in the repetition of the processing of S120 to S140, an unprocessed configuration point is determined to be not existing at S120. In this case, S120 makes a negative determination, and the processing proceeds to S160.

At S160, it is determined whether the state of the learning target flag is true. When the learning target flag is determined to be true, that is, when a new road at least partially passes through the learning target determination region, S160 makes a positive determination. In this case, at S170, the new road, which is a processing object, is stored as information of the learned road in the HDD 24 and/or the external memory 25. Specifically, both of the leaving point and the return point, which are end points of the new road, are specified as connection nodes to the existing road in the map data. Further, various data, such as the connection nodes, a link ID of the existing road, which the connection nodes connect, link information of a link, which connects the connection nodes therebetween, and configuration points, which define the shape of the link, are registered as a learned road.

Alternatively, when the learning target flag is determined to be false at S160, that is, when the new road does not pass through the learning determination region, S160 makes a negative determination. In this case, the learned road identifying operation is terminated. In the present condition, the new road is not registered as information of the learned road.

Figure 3A:
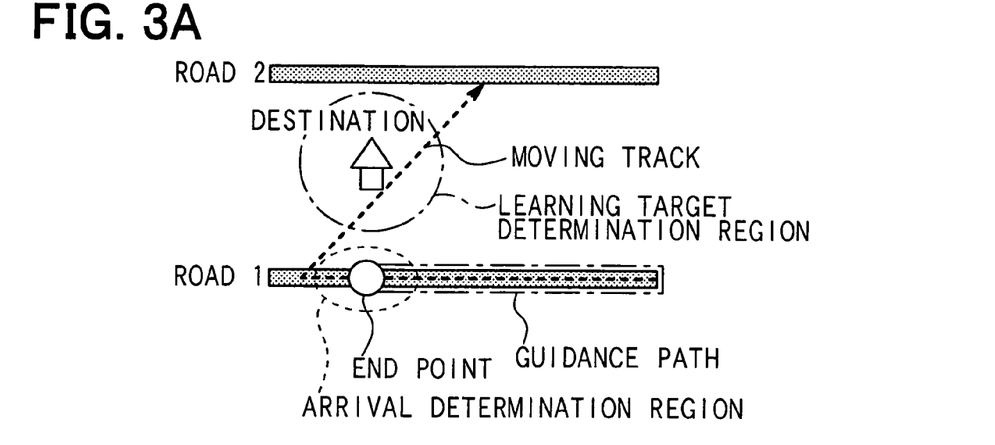
FIGS. 3A to 3C are explanatory views each showing one example of the learned road identifying operation.
Figure 3B:
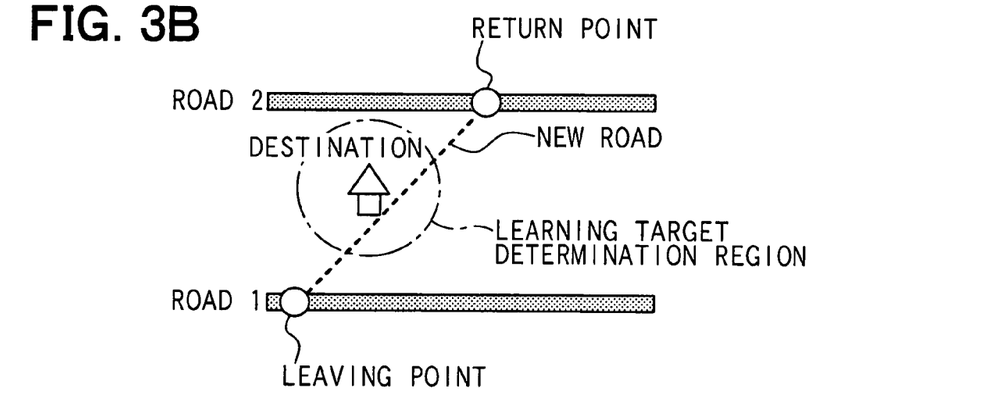
Figure 3C:
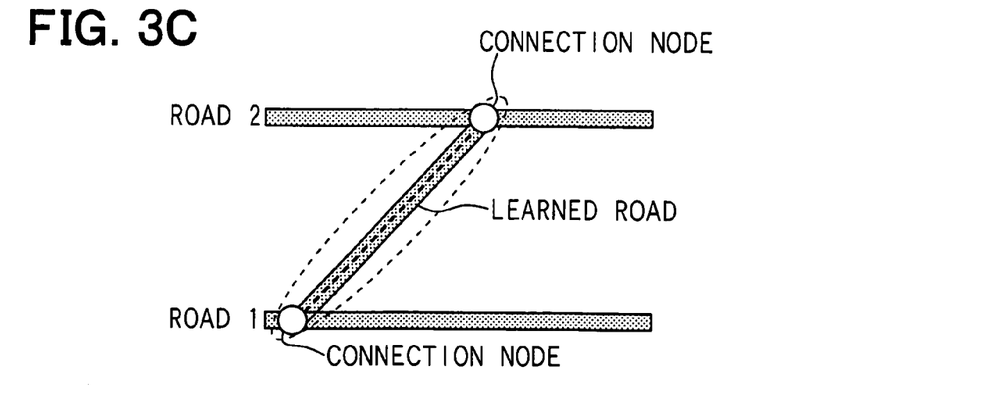

Each of FIGS. 3A to 3B is an explanatory view showing a detailed example of an application of the learned road identifying operation. In the example shown in FIGS. 3A to 3C, a new road is detected after passing an end point, at which a routing assistance on a guidance path to a destination terminates. In this case, the guidance path is constituted of an existing road. The new road is registered as a learned road in the map data.

In the example shown in FIG. 3A, the destination of the routing assistance is distant from a road 1, which is the existing road in the map data and includes the guidance path. In this case, the end point of the guidance path is set at a point, which is on the road 1 and close to the destination. Subsequently, the arrival determination region is set around, as a center, the end point of the guidance path. When the vehicle reaches the arrival determination region, the arrival determination is made and outputted. In response to the arrival determination, a user receives a guidance and informed of the vehicle being close to the destination. At this time point, the routing assistance to the destination is completed. As show by the moving track indicated by the thick dashed line in FIG. 3A, it is conceived that the vehicle leaves from the road 1 after passing through the end point of the guidance path on the road 1, and the vehicle returns to the existing road 2 in the map data after reaching the destination.

In this case, as shown in FIG. 3B, a new road is detected based on the moving track subsequent to the output of the arrival determination. The new road is constituted of the leaving point on the road 1, the return point on the road 2, and configuration points defined based on the moving track between the leaving point on the road 1 and the return point on the road 2. Further, the detected new road is compared with the learning target determination region, which is defined around the destination. It is noted that the learning target determination region corresponding to the destination is maintained even when the arrival determination is outputted and the routing assistance to the destination is completed.

In the present example, the detected new road passes through the learning target determination region around the destination. Therefore, as shown in FIG. 3C, the learned road is registered as road data. The learned road is constituted of the connection node corresponding to the leaving point on the road 1, the connection node corresponding to the return point on the road 2, and the link, which connects both the connection nodes.

Figure 4A:
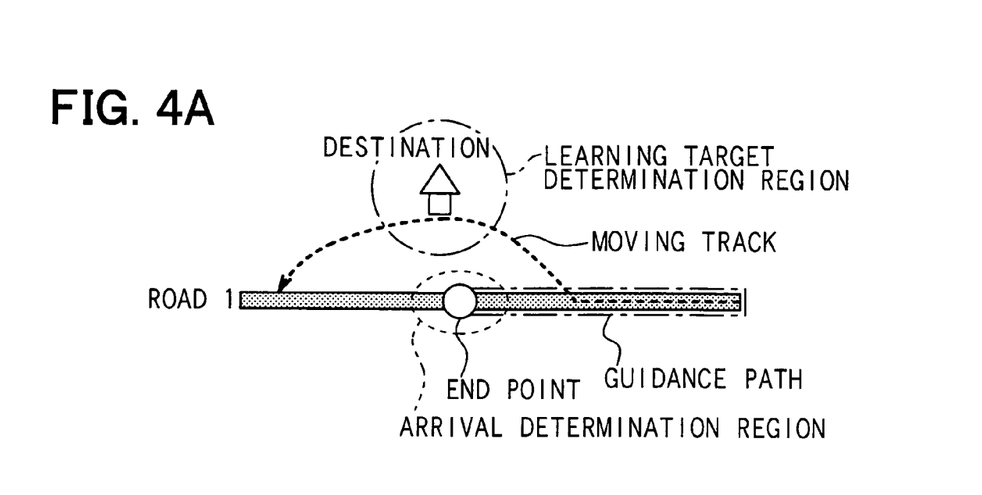
FIGS. 4A to 4C are explanatory views each showing another example of the learned road identifying operation.
Figure 4B:
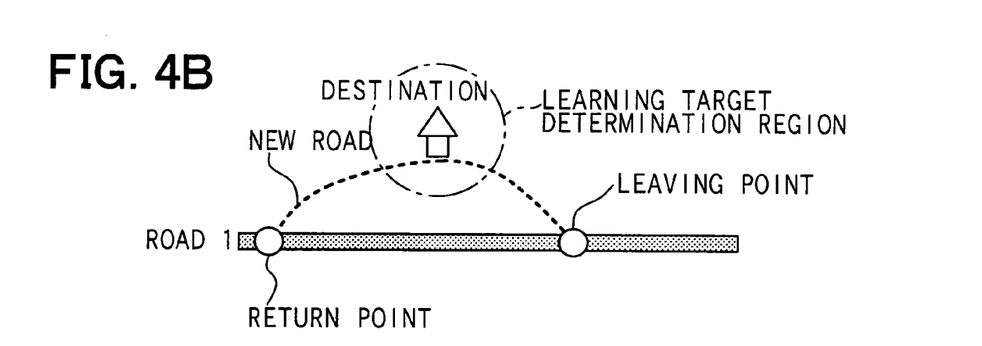
Figure 4C:
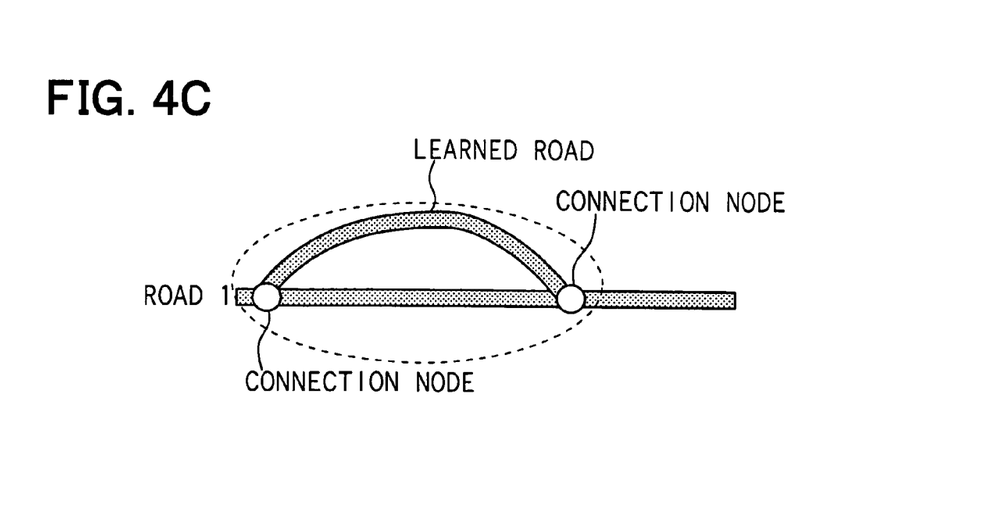

Each of FIGS. 4A to 4C is an explanatory view showing a detailed example of another application of the learned road identifying operation. In the example shown in FIGS. 4A to 4C, a new road is detected before passing an end point, at which a routing assistance on a guidance path to a destination terminates. In this case, the guidance path is constituted of an existing road. The new road is registered as a learned road in the map data.

In the example shown in FIG. 4A, the destination of the routing assistance is distant from a road 1, which is the existing road in the map data and includes the guidance path. In this case, the end point of the guidance path is set at a point, which is on the road 1 and close to the destination. Subsequently, the arrival determination region is set around, as a center, the end point of the guidance path. When the vehicle reaches the arrival determination region, the arrival determination is made and outputted. In response to the arrival determination, a user receives a guidance and informed of the vehicle being close to the destination. At this time point, the routing assistance to the destination is completed. As show by the moving track indicated by the thick dashed line in FIG. 4A, it is conceived that the vehicle leaves from the road 1 before passing through the end point of the guidance path on the road 1, that is, before outputting the arrival determination, and the vehicle returns to the existing road 1 after reaching the destination.

In this case, as shown in FIG. 4B, a new road is detected based on the moving track subsequent to leaving from the road 1, which is the guidance path. The new road is constituted of the leaving point and the return point on the road 1, and configuration points defined based on the moving track between the leaving point on the road 1 and the return point on the road 2. Further, the detected new road is compared with the learning target determination region, which is defined around the destination.

In the present example, the detected new road passes through the learning target determination region around the destination. Therefore, as shown in FIG. 4C, the learned road is registered as road data. The learned road is constituted of the connection nodes, which correspond to the leaving point and the return point on the road 1, and the link, which connects both the connection nodes.

(Effect)

According to the navigation device 1 of the present embodiment, the following effects can be produced.

(1) Among new roads, which are generated based on moving tracks obtained after leaving, i.e. deviating of the vehicle from existing roads in the map data, only a new road, which passes through the learning target determination region close to the destination, is registered as a learned road in the map data. That is, the control unit 29 determines whether a new road is included in the learning target determination region and thereby to effectively detect an access road to the destination. Further, only the new road included in the learning target determination region is set as a learning object. Thereby, a road, which is low in utility value in the course of the routing assistance, can be eliminated. Thus, only a road, which is high in utility value in the course of the routing assistance, can be learned. In the present operation, an effect of the road learning function of the navigation device 1 can be further enhanced.

(2) The learning target determination region of the destination is maintained even after outputting of the arrival determination to the destination on the existing road of the map data. Therefore, the learned road identifying operation of the new road can be performed even when the vehicle passes through a new road, which is not registered in the map data, after outputting of the arrival determination. Therefore, a road, which the vehicle passes through after outputting of the arrival determination to the destination, can be steadily learned. Thus, such a road, which is high in utility value, can be steadily learned.

Summarizing the above description, a navigation device performs a routing assistance to a destination specified in map data using a road, which is specified by the map data, and a new road. The navigation device includes a setting section S10, a generating section S110, a determination section S140, a storing section S170, and a new road registering section S170. The setting section S10 is configured to set a certain geography range as a determination region around the destination, which is an object of the routing assistance, in a map specified by the map data. The generating section S110 is configured to generate a new road, which is not registered in the map data, based on a moving track of the navigation device when a current position of the navigation device deviates from a region of a road in the map data. The determination section S140 is configured to determine whether the determination region, which is set by the setting section S10, includes at least a part of the new road, which is generated by the generating section S110. The storing section S170 is configured to store the new road, which is generated by the generating section S110. The new road registering section S170 is configured to register the new road in the storing section S170 when the determination section S140 determines that the determination region includes at least a part of the new road. In the course of the routing assistance, the determination region is maintained after a determination of arrival to the destination on the road, which is specified by the map data, is made and outputted. The determination region, which the setting section S10 sets to a previous destination, is once maintained until a destination of a new routing assistance is specified, and thereafter the determination region is canceled. The determination region, which is currently maintained, is canceled when the navigation device is de-activated. The determination region, which corresponds to the destination, is canceled when the destination of the routing assistance is canceled in accordance with an instruction of a user.

(Modification)

In the embodiment, the processings and other structures are applied to a navigation system. Alternatively, it is noted that the processings and other structures of the embodiment may be applied to an apparatus, which has a navigation function, such as a cellular phone, a personal digital assistant (PDA), a personal computer such as a notebook computer, a handheld game machine, a data server center, and the like.

The above processings such as calculations and determinations are not limited being executed by the control unit 29 in the embodiment. The control unit 29 may have various structures and may be combined with another device such as a processing unit and a driver unit.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A navigation device comprising:
   a storage configured to store a generated new road; and
   a processor, the processor being configured to
      set, in a setting section, a determination region, which is a certain geography range around a destination in a map specified by map data, the destination being specified as an object of a routing assistance in the map data;
      generate, in a generating section, a new road, which is not registered in the map data, based on a moving track of the navigation device from a point where a vehicle leaves an existing road registered in the map data to a point where the vehicle returns to the existing road in the map data, when a current position of the navigation device deviates from a region of an existing road registered in the map data;
      determine, in a determination section, whether the set determination region includes at least a part of a generated new road; and
      register, in a new road registering section, the generated new road in the storage when the determination section determines that the set determination region includes at least a part of the generated new road,
   wherein the navigation device is configured to perform the routing assistance to the destination using both the existing road registered in the map data and the registered new road,
   wherein a previous determination region, which the setting section sets to a previous destination, is once maintained until a new destination of the routing assistance is set, and
   the processor cancels the previous determination region of the previous destination, when a new destination of the routing assistance is set.

2. The navigation device according to claim 1, wherein, in the course of the routing assistance, the determination region is maintained after a determination of arrival to the destination on the existing road, which is specified by the map data, is made.

3. The navigation device according to claim 1, wherein the determination region, which is set by the setting section to the previous destination, is maintained until a new destination of the routing assistance is set, and
   the determination region of the previous destination is canceled when a new destination of the routing assistance is set.

4. The navigation device according to claim 1, wherein the determination region of the destination, is canceled when the destination of the routing assistance is canceled in accordance with an instruction of a user.

5. The navigation device according to claim 1, wherein the processor is further configured to not register the generated new road in the storage until the determination section determines that the set determination region includes at least a part of the generated new road.

6. A navigation device comprising:
   a storage configured to store a generated new road; and
   a processor, the processor being configured to
      set, in a setting section, a determination region, which is a certain geography range around a destination in a map specified by map data, the destination being specified as an object of a routing assistance in the map data;
      generate, in a generating section, a new road, which is not registered in the map data, based on a moving track of the navigation device when a current position of the navigation device deviates from a region of an existing road registered in the map data;
      determine, in a determination section, whether the set determination region includes at least a part of a generated new road; and
      register, in a new road registering section, the generated new road in the storage when the determination section determines that the set determination region includes at least a part of the generated new road,
   wherein the navigation device is configured to perform the routing assistance to the destination using both the existing road registered in the map data and the registered new road,
   wherein the setting section is further configured to change the determination region according to a distance between the destination and an existing road, which is closest to the destination in the map data.

7. The navigation device according to claim 6, wherein the setting section is further configured to enlarge the determination region, as the distance becomes large.

8. The navigation device according to claim 6, wherein the setting section is further configured to enlarge the determination region, as the distance between the destination and an existing road, which is registered in the map data and which is closest to the destination, becomes large.

9. The navigation device according to claim 6, wherein, in the course of the routing assistance, the determination region is maintained after a determination of arrival to the destination on the existing road, which is specified by the map data, is made.

10. The navigation device according to claim 6,
wherein the determination region, which is set by the setting section to the previous destination, is maintained until a new destination of the routing assistance is set, and
the determination region to the previous destination is canceled when a new destination of the routing assistance is set.

11. The navigation device according to claim 6, wherein the determination region of the destination, is canceled when the destination of the routing assistance is canceled in accordance with an instruction of a user.

12. The navigation device according to claim 6, wherein the processor is further configured to not register the generated new road in the storage until the determination section determines that the set determination region includes at least a part of the generated new road.

13. A method for updating map data for a navigation device, the method comprising:
setting a determination region, which is a certain geography range around a destination in a map specified by map data, the destination being specified as an object of a routing assistance in the map data;
generating a new road, which is not registered in the map data, based on a moving track of a navigation device from a point where a vehicle leaves an existing road registered in the map data to a point where the vehicle returns to the existing road in the map data, when a current position of the navigation device deviates from a region of an existing road registered in the map data;
determining whether the set determination region includes at least a part of the generated new road; and
registering the generated new road in a storing unit in response to determination that the set determination region includes at least a part of the generated new road,
wherein a previous determination region to a previous destination, is once maintained until a new destination of the routing assistance is set, and
the previous determination region to the previous destination is canceled when a new destination of the routing assistance is set.

14. The method according to claim 13, wherein the generated new road is not registered in the storage until the determination is that the set determination region includes at least a part of the generated new road.

15. A method for navigation, the method comprising:
setting a determination region, which is a certain geography range around a destination in a map specified by map data;
generating a new road, which is not registered in the map data, based on a moving track of a navigation device from a point where a vehicle leaves an existing road registered in the map data to a point where the vehicle returns to the existing road in the map data when a current position of the navigation device deviates from a region of an existing road registered in the map data
determining whether the set determination region includes at least a part of the generated new road;
registering the generated new road in a storing unit in response to determination that the set determination region includes at least a part of the generated new road; and
performing a routing assistance to the destination using both the existing road registered in the map data and the registered new road,
wherein a previous determination region to a previous destination, is once maintained until a new destination of the routing assistance is set, and
the previous determination region to the previous destination is canceled when a new destination of the routing assistance is set.

16. The method according to claim 15, wherein the generated new road is not registered in the storage until the determination is that the set determination region includes at least a part of the generated new road.

* * * * *